Sept. 10, 1957  P. S. BALDWIN  2,805,551
MASTER CYLINDER
Filed July 12, 1954

INVENTOR.
Philip S. Baldwin
BY

United States Patent Office 2,805,551
Patented Sept. 10, 1957

2,805,551

MASTER CYLINDER

Philip S. Baldwin, Florence, Italy, assignor of one-half to Fiat Società per Azioni, Turin, Italy Application July 12, 1954, Serial No. 442,714

Claims priority, application Italy July 27, 1953

3 Claims. (Cl. 60—54.6)

This invention relates to master cylinders for hydraulic transmission, more particularly hydraulic brakes for motor vehicles, of the type in which means are provided for controlling communication between the master cylinder and reserve tank, in order to insure an uninterrupted communication between the cylinder chamber situated ahead of the piston and reserve tank during the full retractile or back-stroke of the piston, and in order to intercept said communication during the protractile or forward stroke, and in which said means comprise a resilient ring mounted for free axial floating between two rigid abutments within the master cylinder.

It is the object of this invention to provide a master cylinder of the abovementioned type, which is reliable in operation and simple in construction, and in which the number of constituent parts is minimised and their construction such as to make them cheap and easy to manufacture and assemble.

A further object of this invention is to provide a master cylinder, in which the structure and arrangement of said parts is such as to permit the use of materials more suited to the purpose than those presently in use and adapted to reduce wear during operation and improve life.

A further object of this invention is to provide a master cylinder, in which said component parts are of a construction such as safely and quickly eliminate any air bubbles in the master cylinder during initial bleeding of the hydraulic brake system.

These and further objects as well as advantages of the master cylinder according to this invention will be understood from the appended description referring to the accompanying drawings which show a construction thereof by way of example and in which.

Similar parts appearing in the various figures are denoted by the same reference numerals throughout the drawing.

Figure 1:
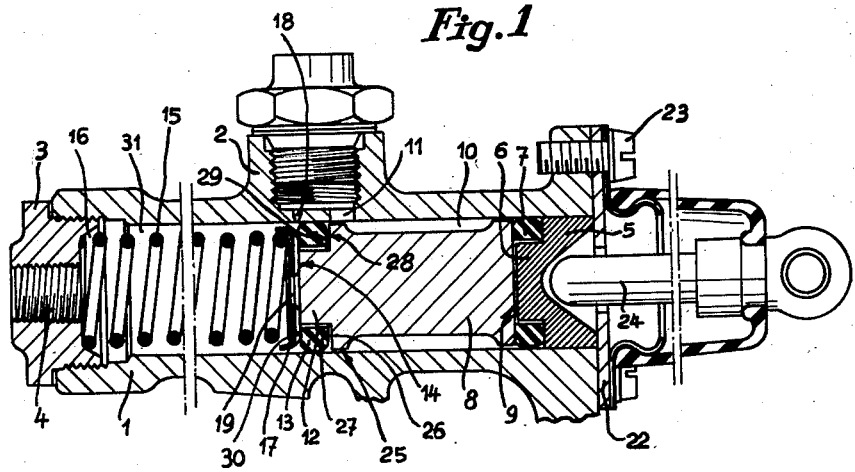
Figure 1 is a longitudinal axial sectional view of the master cylinder according to this invention.
Figure 2:
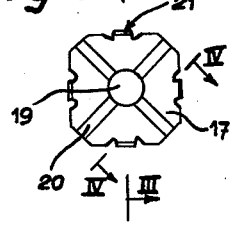
Figure 2 shows a constructional detail.
Figure 3:
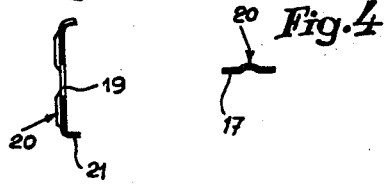
Figure 3 is a sectional view on line III—III of Figure 2.
Figure 4:
Figure 4 is a sectional view on line IV—IV of Figure 2.

The numeral 1 denotes the master cylinder communicating at the top over a fitting 2 with a conventional reserve tank (not shown).

The inner hollow of the cylinder 1 is closed at the front by a screw-threaded plug 3 and connects through an axial bore 4 in the plug with a pipe (not shown) leading to the brake wheel cylinders.

At the end of the hollow in the cylinder 1 remote from the plug a piston comprising a push member 5 and a head member 8 is arranged. The push member 5 is slidably mounted within the cylinder 1, its outer diameter matching substantially the cylinder bore.

The numeral 6 denotes a cylindrical extension of reduced diameter on the push member 5 on which a packing ring 7 of resilient material, preferably rubber is fitted. The bore of said ring is substantially equal or silghtly larger than the outer diameter of the cylindrical extension 6, the ring size in an axial direction being, under the conditions in which said ring is assembled, slightly larger than the axial length of the extension 6. The head member 8 of the piston is arranged within the cylinder bore ahead of the push member 5. In the inoperative position of the mechanism shown in Figure 1, the rear face 9 of said head member 8 contacts the cooperating side face on the ring 7.

An annular chamber 10 is provided in the periphery of the piston head 8 and permanently connects over a hole 11 bored in the top portion of the wall of the master cylinder 1 with the fitting 2 leading to the reserve tank.

The outer diameter of the head member 8 is substantially smaller than the bore of the cylinder 1 and therefore the member fits in said bore with an appreciable clearance. On the near side of the plug 3 the head 8 is provided with a cylindrical extension 12 of reduced diameter. A ring 13 of resilient material, preferably rubber, is fitted on the extension 12, said ring being of such proportions that its bore slightly exceeds the outer diameter of the extension 12 and its thickness in an axial direction is smaller than the axial length of said extension. A spring 15 is interposed between the front face 14 of the extension 12 and plug 3, one end being received in a recess 16 in the plug. The other end of the spring supports a pressed sheet metal cap 17 which is pressed against the face 14.

18 denotes a small relief hole connecting the bore in the cylinder 1 situated ahead of the piston head 8 with the reserve tank through the fitting 2. The relief hole is arranged to open into the bore in the cylinder 1 a small distance ahead of the line of contact between the outer periphery of the ring 13 and inner surface of the bore in the cylinder 1.

The spring bearing cap 17, which is made of sheet metal, is formed with a central bore 19 and a number of radial ribs 20 and wings 21. The wings 21 serve for fastening the cap to the end of the spring 15. Fastening is effected by forcing the cap against the elasticity of the wings or rolling the latter around the end turn of the spring. As will be seen from the drawing, the cap is mounted on the spring with its ribs facing the face 14 of the piston head member 8, thereby leaving a clearance between the central hole 19 in the cap and its outer periphery, for the flow of the fluid filling the master cylinder hollow ahead of the piston 8 and displaced within the cylinder during operation.

On the other hand, the radial size of the cap 17 and its ribs 20 is such that their portions remotest from the axis of the cylinder 1 form in front of the piston head member 8 rigid stops which limit during operation the axial displacements of the floating ring 13.

In the inoperative condition of the mechanism shown in Figure 1, the spring 15 pushes the piston head 8 against the resilient packing ring 7, which transmits this pressure to the push member 5, the latter abutting the end stop formed by the flange 22 secured to the casing of the master cylinder by means of screws 23, 24 denotes the push rod actuated by the brake pedal.

When the piston 5, 8 is in its fully retracted position, the communication between the cylinder 1 and reserve tank is established through the fitting 2, hole 11, annular chamber 10, clearance 25 between the outer periphery of the front portion of the head 8 and inner surface of the bore in the cylinder 1, the clearance 26 between the rear face of the ring 13 and associated shoulder on the head 8, annular clearance 27 between the inner surface of the ring 13 and periphery of the cylindrical extension 12, finally through the clearance formed between the cap 17 provided with ribs 20 and the front face of the resilient ring 13 or between the cap 17 and face 14 of the head portion 8 towards the hole 19 of the cap respectively. During the forward piston stroke the floating ring 13 is moved backward with respect to the head 8 so that its rear face 29 abuts the radial annular shoulder 28 connecting the periphery of the extension 12 with the periphery of the head 8. Consequently as the forward stroke starts, the communication between the reserve tank and the portion of the master cylinder bore ahead of the piston head 8 is intercepted.

During the return stroke of the piston 5, 8 which is performed under the action of the spring 15, the floating ring 13 is displaced with respect to the head 8 in a direction opposite the one previously described and abuts by its forward face 30 the ribs 20 on the cap 17. This is due to the suction generated in the cylinder bore ahead of the piston 5, 8 during the return stroke. During this stroke fluid is drawn from the reserve tank and flows through the fitting 2, hole 11, annular chamber 10, clearances 25, 26 and 27 and, finally, through the pressed sheet metal cap 17, thereby filling the line.

The function of the small relief hole 18 opening a very short distance ahead of the line of contact between the periphery of the floating ring 13 and inner wall of the bore in the cylinder 1, is to discharge into the reserve tank any excess fluid sucked into the cylinder and make up for variations in volume of the fluid due to temperature.

As the forward stroke starts, the floating ring 13 moves beyond the outlet of the hole 18 at null value of the hydraulic pressure. This is due to the fact that the fluid is discharged through the relief hole before the top of the periphery of the ring 13 reaches beyond said hole.

Under normal conditions, that is, when inoperative or at the beginning of the forward stroke, when no hydraulic pressure has been established as yet in the chamber 31, the resilient ring 13 is in contact with the inner wall of the chamber 31 only at the top of its convex outer periphery. The remaining portion of said periphery is spaced apart from the cylinder wall, the bore in the ring 13 being unobstructed by any rigid member and constantly communicating with the fluid within the chamber 31. Consequently, the ring 13 is fully free to float in an axial direction in its seat.

This free assembly permits the ring 13 to rotate within the cylinder on flow and backflow of the fluid between the cylinder compression chamber 31 and reserve tank during the alternating motion of the piston 5, 8. Consequently, as the ring 13 moves beyond the outlet of the relief hole 18, it constantly establishes new points of contact between the region of said outlet and its outer periphery, which reduces wear of the ring and improves its life.

Moreover, as a hydraulic pressure is established in the chamber 31, the rear portion only of the periphery of the ring 13 contacts with the outlet of the relief hole 18 on movement of the ring, this portion being situated behind the top of the ring curvature. The forward portion is in this case spaced apart from the outer periphery of the cylinder and is subjected to the action of the pressure fluid.

With a packing member of the conventional cup construction, the full outer periphery of the edge of the cup lip down to its base comes gradually in contact with the outlet of the relief hole, as the cup slides beyond the said outlet during the forward stroke of the piston, that is, when a considerable hydraulic pressure is set up in the chamber ahead of the piston. In this case, obviously the contact area is larger than when a floating ring is used. In order to prevent excessive wear of the packing cup it is then necessary to reduce as far as possible the diameter of the relief hole (down to about 0.7 millimeter). This is not required when a floating ring is employed, and it has been ascertained that the diameter of the relief hole may unobjectionably be about one millimeter. This simplifies construction and reduces the risk of obstruction of the relief hole 18 by dirt.

When a floating ring is employed as packing member, said ring further functioning as a valve in the forward portion of the piston head, on the return stroke, that is, when the reserve tank supplies liquid to the chamber ahead of the piston, no radial compression of the ring should occur for permitting the fluid flow, as would be required with a cup packing member. Consequently the ring can be made of harder rubber than a cup member, its resistance against wear being thereby improved.

A freely floating ring assembled for axial displacement does not oppose per se the flow of fluid from the reserve tank to the cylinder chamber situated ahead of the piston on operation. It will be superfluous to arrange a double-acting valve at the outlet from the cylinder chamber towards the conduits leading to the wheel brake cylinder, nor will air be drawn into the cylinder through the packing members for the wheel brake cylinders.

Finally, on account of the fact that, when a hydraulic pressure is set up in the chamber, the lower portion only of the convex outer periphery of the ring 13 behind its top portion contacts the inner cylinder wall in the proximity to the middle portion of said periphery, the forward portion being still spaced apart from said wall, so that resistance due to friction is minimized.

The result is that the effort required on the brake pedal for approaching the brake shoes is minimized, the braking efficiency being nevertheless greatest.

The resilient ring 7 tightly sealing the piston rear end, which is arranged between the push member 5 and piston head 8 is in no case subjected to the hydraulic pressure set up during the forward stroke in the cylinder chamber 31. This results in the advantage that the packing ring 7 does not contribute on displacement to any appreciable increase in friction resistance.

Figure 5:
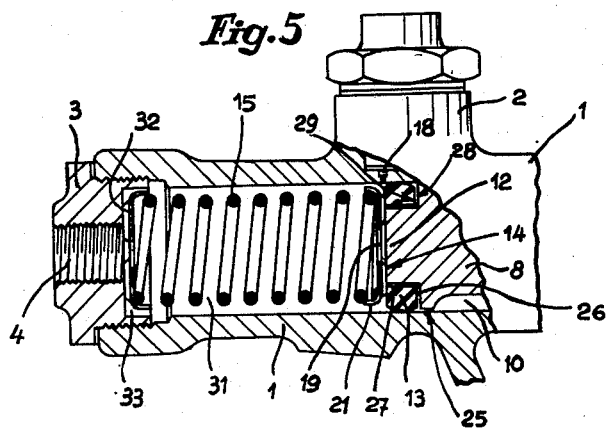
Figure 5 is a longitudinal cross section of a modified construction of the master cylinder.

The master cylinder structure shown in figure 5 is substantially identical with the structure shown in Figure 1 as regards the cylinder and piston. The only difference resides in the fact that the spring is provided at its end normally bearing on the plug closing the cylinder chamber 31 with a cap quite similiar to the cap secured to its end acting on the piston head 8. This arrangement is of considerable importance, inasmuch as it facilitates evacuation of the cylinder chamber 31 during initial bleeding of the cylinder. In fact, the peripheral passages around the above cap cause air to be positively expelled from the inside of the cylinder towards the outlet vent hole 4 during the piston protractile stroke.

When no cap is provided between the plug and end of the spring 15, as is the case of the construction shown in Figure 1, air bubbles remain in the top portion of the cylinder chamber 31 even after completion of the initial bleeding step. This air must be discharged into the reserve tank through the relief hole 18. This necessitates repeated protractile and retractile piston strokes. It will be understood that adoption of the arrangement shown in Figure 5 considerably accelerates the initial bleeding.

What I claim is:

1. A master cylinder having a supply port and a relief port communicating with a source of fluid supply, an outlet port communicating with an hydraulic system, a compression chamber in said cylinder, a piston movable in said cylinder, said piston having sufficient clearance with said cylinder wall to permit ready passage of fluid therebetween, a channel around said piston, said channel communicating with said supply port, said piston having a reduced extension at one end forming an annular shoulder thereon, a sealing ring mounted over said extension to seal the cylinder between the compression chamber and said fluid supply port, said ring being frictionally supported against the cylinder wall between said relief port and said supply port in rest position, its bore being of a diameter greater than that of said reduced extension so that said bore is not in physical contact with said extension and is free to float thereon, the axial thickness of said ring being less than the axial length of said extension, whereby said ring may float axially on said extension into or out of sealing contact with said shoulder during reciprocal movements of said piston; said ring closing said relief port on the initial protractile movement of the piston before full hydraulic pressure takes effect; a cap in said cylinder peripherally spaced from the cylinder wall and having a substantially greater radial dimension than that of said reduced extension, and a piston return spring between the piston and the discharge end of the cylinder for supporting said cap adjacent said extension and sealing ring to prevent axial displacement of said ring from said extension, said cap being partially spaced from said extension and ring to permit a radial flow of fluid therebetween at the start of the power stroke of the piston.

2. A device according to claim 1 in which said cap has fingers extending axially of the spring, said fingers frictionally gripping the end coil of said spring.

3. A device according to claim 1 in which a second cap member is provided at the opposite end of the spring.

References Cited in the file of this patent

UNITED STATES PATENTS

| | | |
|---|---|---|
| 2,207,127 | La Brie | July 9, 1940 |
| 2,211,403 | Boldt et al. | Aug. 13, 1940 |
| 2,541,312 | Vogel | Feb. 13, 1951 |
| 2,608,063 | White | Aug. 26, 1952 |
| 2,615,304 | Groves | Oct. 28, 1952 |